(12) United States Patent
Bahl et al.

(10) Patent No.: US 7,974,226 B2
(45) Date of Patent: *Jul. 5, 2011

(54) SEPARATING CONTROL AND DATA IN WIRELESS NETWORKS

(75) Inventors: Paramvir Bahl, Sammamish, WA (US);
Pradeep Kyasanur, Champaign, IL (US); Jitendra D. Padhye, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

This patent is subject to a terminal disclaimer.

(21) Appl. No.: 12/345,468

(22) Filed: Dec. 29, 2008

(65) Prior Publication Data

US 2009/0103506 A1    Apr. 23, 2009

Related U.S. Application Data

(62) Division of application No. 11/135,001, filed on May 23, 2005, now Pat. No. 7,613,138.

(51) Int. Cl.
*H04Q 1/00* (2006.01)
(52) U.S. Cl. .............. 370/310.2; 370/329; 370/338; 370/230
(58) Field of Classification Search ............ 370/338, 370/229, 232, 235, 237, 247, 310.2, 328, 370/329, 330, 334, 352, 353, 412–418
See application file for complete search history.

(56) References Cited

U.S. PATENT DOCUMENTS

| | | | |
|---|---|---|---|
| 6,049,721 A | 4/2000 | Serizawa et al. | |
| 6,609,157 B2 | 8/2003 | Deo et al. | |
| 2002/0145974 A1 | 10/2002 | Saidi et al. | |
| 2003/0086404 A1 | 5/2003 | Beckmann et al. | |
| 2003/0124986 A1 | 7/2003 | Rose et al. | |
| 2004/0047318 A1 | 3/2004 | Matsumoto | |
| 2004/0057453 A1 | 3/2004 | Montgomery, Jr. | |
| 2004/0081131 A1 | 4/2004 | Walton et al. | |
| 2004/0100929 A1 | 5/2004 | Garcia-Luna-Aceves | |
| 2004/0174815 A1 | 9/2004 | Khisti et al. | |
| 2004/0218562 A1* | 11/2004 | Orava et al. | 370/329 |
| 2005/0074030 A1 | 4/2005 | Cho et al. | |
| 2005/0075113 A1 | 4/2005 | Noble | |
| 2006/0004796 A1 | 1/2006 | Nakamura | |
| 2008/0144493 A1* | 6/2008 | Yeh | 370/230 |

OTHER PUBLICATIONS

Cidon, "Distributed Assignment Algorithms for Multihop Packet Radio Networks", IEEE Transactions on Computers, Oct. 1989, pp. 1353-1361, vol. 38, No. 10.
Deng, "Analyzing Split Channel Medium Access Control Schemes with ALOHA Reservation", Ad-Hoc, in Mobile, and Wireless Networks, AdHoc-Now, 2003.
Jain, "Benefits of Packet Aggregation in Ad-Hoc Wireless Network", Technical Report, University of Colorado at Boulder, Aug. 2003.
Karl, KarlNet's TurboCell: Enhancing the Capabilities of Standard 802.11.

(Continued)

*Primary Examiner* — Jean A Gelin
(74) *Attorney, Agent, or Firm* — Lee & Hayes, PLLC

(57) ABSTRACT

Wireless communication techniques are described in which control and data are separated. In an implementation, a method is described which includes sending data packets on a first wireless channel and sending control data relating to the data packets on a second wireless channel having a data rate that is lower than a data rate of the first wireless channel.

19 Claims, 4 Drawing Sheets

OTHER PUBLICATIONS

Li, "MAC-SCC: Medium Access Control with a Separate Control Channel for Multihop Wireless Networks", ICDCSW 03, May 2003, pp. 764-769.

Priya Ravichandran, Explicitly Pipelining IEEE 802.11 to Enhance Performance, Dec. 2003.

Tantra, "An Efficient Scheduling Scheme for High Speed", IEEE 802.11 WLANS, 2003 IEEE 58th Vehicular Technology Conference Proceedings, 2003, pp. 2589-2593.

Xue Yang, Explicit and Implicit Pipelining for Wireless Medium Access Control, VTC, 2003, Department of Electrical and Computer Engineering, and Coordinated Science Laboratory, University of Illinois at Urbana-Champaign.

Zhai, "A Dual-Channel MAC Protocol for Mobile Ad Hoc Networks", IEEE Workshop on Wireless Ad Hoc Sensor Networks, Nov. 2004.

Zhu, "A Five-Phase Reservation Protocol (FPRP) for Mobile Ad Hoc Networks", Wireless Networks, 2001, pp. 371-384, vol. 7, No. 4, Kluwer Academic Publishers, The Netherlands.

* cited by examiner

SEPARATING CONTROL AND DATA IN WIRELESS NETWORKS

This application is a continuation of, and claims priority to, co-pending U.S. patent application Ser. No. 11/135,001, filed on May 23, 2005, which is herein incorporated by reference in its entirety. Any disclaimer that may have occurred during the prosecution of the above-referenced application is hereby expressly rescinded, and reconsideration of all relevant art is respectfully requested.

BACKGROUND

Users have access to an ever increasing variety of devices which can be utilized for an ever increasing variety of purposes. For example, the user may talk on a wireless phone, schedule appointments using a personal digital assistant, edit documents on a personal computer (PC), play games on a game console, watch recorded television programming from a digital video recorder, and so on. Even though each of these devices may be targeted for performing specific tasks, it is often desirable to communicatively couple these devices, one to another. For example, the personal digital assistant may be communicatively coupled to the desktop PC to share a schedule.

Additionally, each of these devices may have peripheral devices which further increase the functionality of the device. For instance, a headset may be utilized with the wireless phone, a global positioning system (GPS) receiver may be utilized with a personal digital assistant, a printer may be utilized with the personal computer, another game console may be attached to the game console so that players can play "head-to-head", and so forth.

One technique that is gaining popularity in the connection of these devices is wireless communication. As the name implies, wireless communication may be utilized such that the devices do not need to be physically connected to communicate. However, as the functionality of the devices continues to increase, the amount of information shared between the devices in also increasing, thereby consuming the bandwidth available over the wireless connection. Likewise, as the number of devices continues to increase, the amount of overall wireless bandwidth consumed by the devices as a whole is also increasing.

Therefore, there is a continuing need for improved techniques for wireless communication.

SUMMARY

Wireless communication techniques are described in which control and data are separated. In an implementation, a method is described which includes sending data packets on one or more wireless channels and sending control data relating to the data packets on at least one other wireless channel having a data rate that is lower than a data rate of the one or more wireless channels. For example, the one or more wireless channels may operate at frequencies about 900 MHz while the at least one channel operates at a frequency below 900 MHz.

In another implementation, a method is described which includes sending a set of data packets on one or more wireless channels and sending control data on at least one other wireless channel during the sending of the set of data packets. The control data is configured to reserve a time on the one or more wireless channels to send another set of data packets.

In a further implementation, a method is described which includes sending a set of data packets on one or more wireless channels and sending contention control data relating to another set of data packets on at least one other wireless channel simultaneously during sending of the set of data packets.

BRIEF DESCRIPTION OF THE DRAWINGS

The same reference numbers are utilized in instances in the discussion to reference like structures and components.

DETAILED DESCRIPTION

Overview

Separating control and data for communication in a wireless network is described. Radio spectrum allocated for use in unlicensed wireless networks is typically distributed across non-contiguous frequency bands, hereinafter also referred to as "slices", "slivers" and "channels". Traditional Medium Access Control (MAC) protocols, e.g., IEEE 802.11, however, only operate in contiguous bands, which is inefficient and results in decreased data transfer bandwidth. In an implementation, a split-channel protocol is described that improves the capacity of a wireless infrastructure and multi-hop wireless network by utilizing a sliver of unused spectrum in the lower frequency band for control purposes which was previously deemed unsuitable for data transfer. Thus, the protocol may increase throughput by moving contention resolution overheads to a separate low-rate channel (e.g., at or below 900 MHz) than a data channel which is to be utilized for transfer of data received from a "higher layer", e.g., an application. The protocol may incorporate a variety of techniques for separate transfer of control and data. For example, the protocol may allow simultaneous channel contention and data transmission by incorporating "advance reservation" on the control channel and "data aggregation" on the data channel, and so on, further discussion of which may be found in relation to the following sections.

In the following discussion, an exemplary environment is described that is configured to employ the protocol. Exemplary procedures are then described which are operable in the exemplary environment, as well as in other environments.

Exemplary Environment

Figure 1:
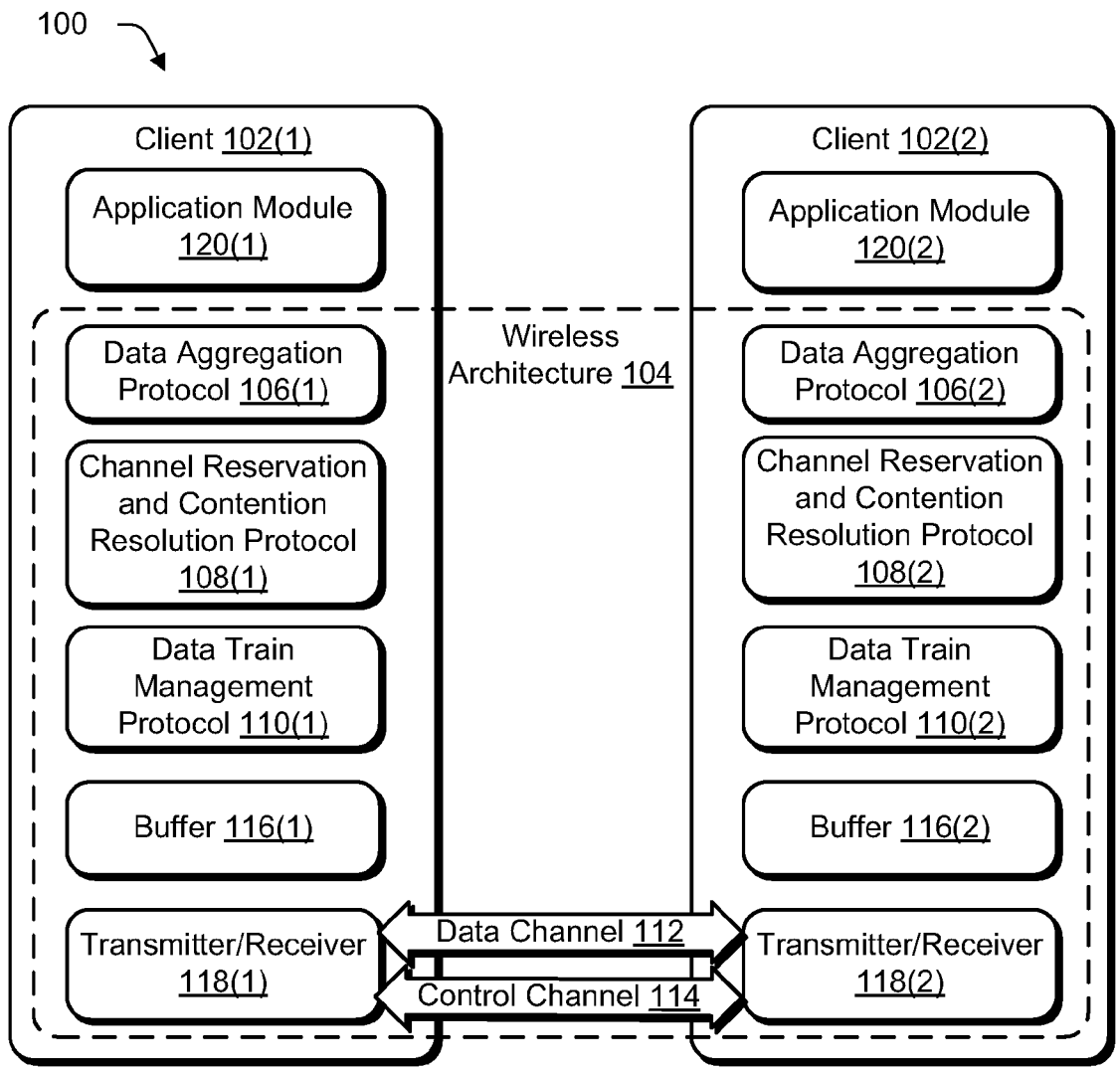
FIG. 1 is an illustration of an environment in an exemplary implementation that is operable to employ a wireless protocol having split data and control channels.

FIG. 1 is an illustration of an environment 100 in an exemplary implementation that is operable to employ a wireless protocol having split data and control channels. The environment includes a first client 102(1) and a second client 102(2) which are communicatively coupled, one to another, using a wireless architecture 104. The clients 102(1), 102(2) may be configured in a variety of ways for communicating via the wireless architecture 104. For example, one or more of the clients 102(1), 102(2) may be configured as a computing device, such as a desktop computer, a mobile station, an entertainment appliance, a wireless phone, a game console, and so forth. Additionally, one or more of the clients 102(1), 102(2) may be configured as a peripheral device, such as a wireless printer. Thus, the clients 102(1), 102(2) may range from full resource devices with substantial memory and processor resources (e.g., personal computers, game consoles) to low-resource devices with limited memory and/or processing resources (e.g., peripheral devices). For purposes of the following discussion, the clients 102(1), 102(2) may also be referenced as "nodes" in the wireless architecture 104.

The wireless architecture 104 is further illustrated as including a plurality of protocol components on each of the clients 102(1), 102(2), respectively, which as illustrated include data aggregation protocols 106(1), 106(2), channel reservation and contention resolution protocols 108(1), 108(2), and data train management protocols 110(1), 110(2). Data aggregation protocols 106(1), 106(2) are representative of functionality which is responsible for aggregating packets to a particular destination into a train of packets. The data aggregation protocols 106(1), 106(2), for instance, may maintain a separate queue for each neighboring node to support per-destination aggregation.

Channel reservation and contention resolution protocols 108(1), 108(2) are representative of functionality to resolve contention and reserve time on a data channel 112 for a packet train received from the data aggregation protocols 106(1), 106(2) by exchanging "request-to-send" (RTS) and "clear-to-send" (CTS) packets on a control channel 114. The channel reservation and contention resolution protocols 108(1), 108(2) also implement "advance reservation", further discussion of which may be found in the following section.

Data train management protocols 110(1), 110(2) are representative of functionality in the wireless architecture 104 that manages respective buffers 116(1), 116(2) at the respective clients 102(1), 102(2). For example, the buffers 116(1), 116(2) may be utilized to buffer packets which were transmitted or received utilizing a respective transmitter/receiver 118(1), 118(2), e.g., radios. The data train management protocol 110(1), 110(2) may also selectively send an acknowledgement packet (ACK) for the received packets in the trains and support retransmission of lost packets. Each of these protocol components will be described in greater detail in the following sections.

Data Aggregation Protocols 106(1), 106(2)

The data aggregation protocols 106(1), 106(2) may be utilized to build a train of packets which has a total size greater than a specified threshold, and transmit the train using a single reservation on the control channel 114. For example, the data aggregation protocol 106(1), 106(2) may be configured such that the control channel 114 does not become a bottleneck to performance because each reservation on the control channel 114 may reserve time for relatively "large" packets, e.g., packet trains.

The RTS-CTS exchange reserves the data channel 112 for communication between a sender and one receiver. Thus, to use the reservation mechanism in conjunction with packet trains, the packets in the train have a common destination. However, successive packets from a higher layer (e.g., the application modules 120(1), 120(2)) may have multiple destinations. Therefore, the data aggregation protocol 106(1), 106(2) may be utilized to separately aggregate packets for each destination.

The data aggregation protocol 106(1), 106(2) may maintain a queue for each known neighbor, e.g., another client. Whenever a packet is received from the higher layer to a destination for which that are no packets pending, the data aggregation protocol 106(1), 106(2) may assemble a new packet train. When the size of the packet train is equal to the threshold (hereinafter referred to as an "aggregation limit"), which is a parameter of the data aggregation protocol 106(1), 106(2), the packet train is transferred to the channel reservation and contention resolution protocol 108(1), 108(2) for scheduling and subsequent transmission.

To ensure that each packet is delivered, even if the aggregation limit has not been reached, the data aggregation protocol 106(1), 106(2) may utilize another parameter called "aggregation timeout", which specifies a maximum time a partially built packet train may wait for a new packet. Thus, even when multiple packets to a single destination are not available, the packet is sent as specified by the aggregation timeout parameter.

A timer, for instance, may be associated with each packet train being built, and is reset to the value of aggregation timeout whenever a new packet is added to the train. When the timer expires, the packet train associated with the timer is "handed off" to channel reservation and contention resolution protocol 108(1), 108(2) for scheduling even if the size of the packet train is less than the aggregation limit. Therefore, the timeout mechanism ensures that there is an upper bound on the maximum delay introduced by the data aggregation protocol 106(1), 106(2).

The data aggregation protocol 106(1), 106(2) may also be enhanced to use a threshold based on a total size of packets in a packet train, in addition to using a threshold based on a number of packets in a packet train. This extension may be useful when a size of the individual packets varies significantly.

In an implementation, the average size of data transmitted for each contention resolution attempt is sufficiently large to achieve significant performance improvements be aggregating packets into a train of packets and reserving the data channel for the whole train with the single contention resolution operation. Thus, by using data aggregation technique, the size of the packet train effectively increases the size of the "packets" communicated on the data channel. For instance, the data aggregation protocols 106(1), 106(2) may be utilized such that the average packet train size is larger than a threshold, such that an improvement in the throughput of the data channel 112 is larger than the data rate of the control channel 114.

Channel Reservation and Contention Resolution Protocol 108(1), 108(2)

Channel reservation and contention resolution protocol may include two parts, a reservation protocol and a contention protocol. The reservation protocol exchanges control packets between a sender and a receiver (e.g., RTS and CTS packets) for reservation of the data channel.

The reservation protocol has a parameter "reserve ahead limit" that indicates a maximum number of packet trains that may be reserved for transmission at any time, i.e., advance reservation. When the data aggregation protocol 106(1), 106(2) hands a packet train to the reservation protocol, if the number of already reserved packets awaiting transmission is less than the reserve ahead limit, then a new reservation is initiated. Otherwise, the packet train is buffered (e.g., via a respective buffer 116(1), 116(2)) until a reservation opportunity arises later.

Each channel reservation and contention resolution protocol 108(1), 108(2) on the respective clients 102(1), 102(2)

may also maintain a reservation table to tracks reservation already scheduled for communication on the data channel 112. A sender initiating the reservation first computes a time "T" utilized for transmitting the associated packet train and receiving an acknowledgement (ACK). The sender then examines the reservation table for an earliest time "E", starting from an estimated end of the RTS-CTS exchanges, when the data channel is continuously free for T duration. The pair (E, T) is sent in the RTS. The receiver also examines its reservation table to check if the duration (E, T) is indeed free. If the channel is free during (E, T), then (E, T) is sent back in the CTS. Otherwise, a next possible time after E (denoted as "E1") is chosen, for which, the channel is free for duration T and (E1, T) is sent back in the CTS. The receiver adds the pair sent in the CTS to its reservation table. When the sender receives a CTS with some pair (E, T), it checks if this pair conflicts with an entry in the reservation table. If there is no conflict, then the reservation is successful, and (E, T) is added to the reservation table. Otherwise, a new reservation attempt is initiated.

RTS or CTS packets may be lost due to errors or collisions. Therefore, the reservation protocol may use a retransmission procedure which doubles a contention window when encountering a collision. When a successful reservation is completed by the sender, the packet train is scheduled for transmission on the data channel at time E. This protocol will be described in greater detail in the following discussion.

Advance reservation can be utilized to "hide" variations in contention resolution and data transfer durations. For example, advance reservation may provide loose synchronization among nodes through specifying an item in a control packet relative to reception of that packet. The reservation interval may be set sufficiently large such that an amount of time utilized to transmit a data train accounts for propagation delay, but is not so long as to encounter clock drift errors. For instance, the reserve ahead limit may be set to equal a duration utilized to transmit a limited multiple of data packets, and thereby prevent data packet collisions resulting from two transmissions overlapping each other.

Data Train Management Protocol 110(1), 110(2)

The data train management protocol 110(1), 110(2) may be utilized to transmit a burst of packets during a single transmission opportunity. However, because the underlying data channel may not be error free, some of the packets in a packet train may be lost or corrupted. Therefore, these packets are retransmitted. In an implementation, a selective acknowledgment technique is employed in which a single acknowledgement packet (ACK) is utilized at the end of a packet burst. The acknowledgement packet, for instance, may utilize a bit map to indicate which packets were correctly received. Based on the received acknowledgement packet, the lost and/or corrupted packets of a packet train are assembled into a new packet train and retransmitted after obtaining a reservation from the reservation protocol as previously described. In an instance in which an acknowledgement packet is not received at the end of a packet train transmission, the packet train may be retransmitted.

In an implementation, each packet train is retransmitted a number of times that is below a specified threshold, which is referred to as a "retransmission threshold". Each packet train may have a sequence number, and individual packets within the packet train may be identified by a number relative to the packet train. Thus, the packet train transmission management may be implemented without sending a separate acknowledgement (i.e., ACK) for each individual packet, but rather a single acknowledgement that may be sent which describes a plurality of packets in a packet train.

The received packets, in an implementation, are communicated to a higher layer (e.g., the application modules 120(1), 120(2)) in order. When a packet in a packet train is lost, but subsequent packets are received correctly, the received packets may be buffered. After the missing packet is received following a retransmission, each of the buffered packets is communicated in order, one to another. A timeout may be associated with the buffer to ensure that if one or more packets in a train are never received, then subsequently received packets are transferred to the higher layer out of order after the timeout expires.

Figure 2:
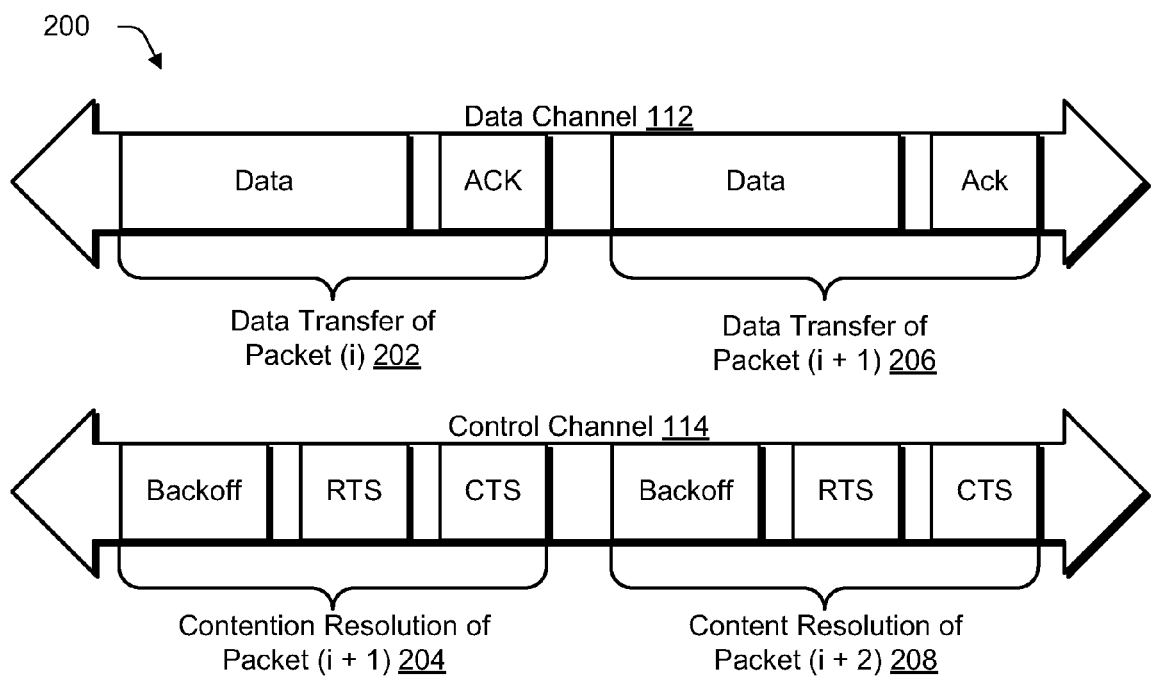
FIG. 2 is an illustration of data transfer in an exemplary implementation which may be performed using the data channel and the control channel of FIG. 1.

FIG. 2 is an illustration of data transfer 200 in an exemplary implementation which may be performed using the data channel 112 and the control channel 114 of FIG. 1. The protocol, as previously described, provides separate data and control channels 112, 114. The protocol may utilize Carrier Sense Multiple Access with Collision Avoidance (CSMA/CA) for controlling access to the channel and using control packets, e.g., request to send (RTS) and clear to send (CTS), for channel reservation.

As previously described, previous wireless communication techniques were implemented solely on a data channel. Consequently, content resolution, which is utilized to prevent collisions when transferring data on the channel, was also performed on the data channel. However, contention resolution results in an overhead that uses available bandwidth of the channel without transferring "useful" data, e.g., data useful to a receiving application from a sending application as opposed to control data used for the transfer of that data which resides within the protocol itself. Therefore, the throughput over the high-rate data channel may be improved if the contention resolution phase is moved to the control channel 114 as previously described. In an implementation, the contention resolution phase on the control channel 114 is performed in parallel (i.e., simultaneous) with data transfer on the data channel 112, as shown in the exemplary data transfer 200 of FIG. 2. While packet "i" is being transferred on the data channel 112 (which is illustrated by the data transfer packet (i) 202 in FIG. 2), contention resolution for the "i+1" packet is performed on the control channel 114, which is illustrated as "contention resolution of packet (i+1) 204" in FIG. 2. Thus, the data transfer may be performed on a relatively high-bandwidth data channel while contention resolution is performed on a relatively low-bandwidth data channel that was not previously utilized for control or data transfer.

Figure 3:
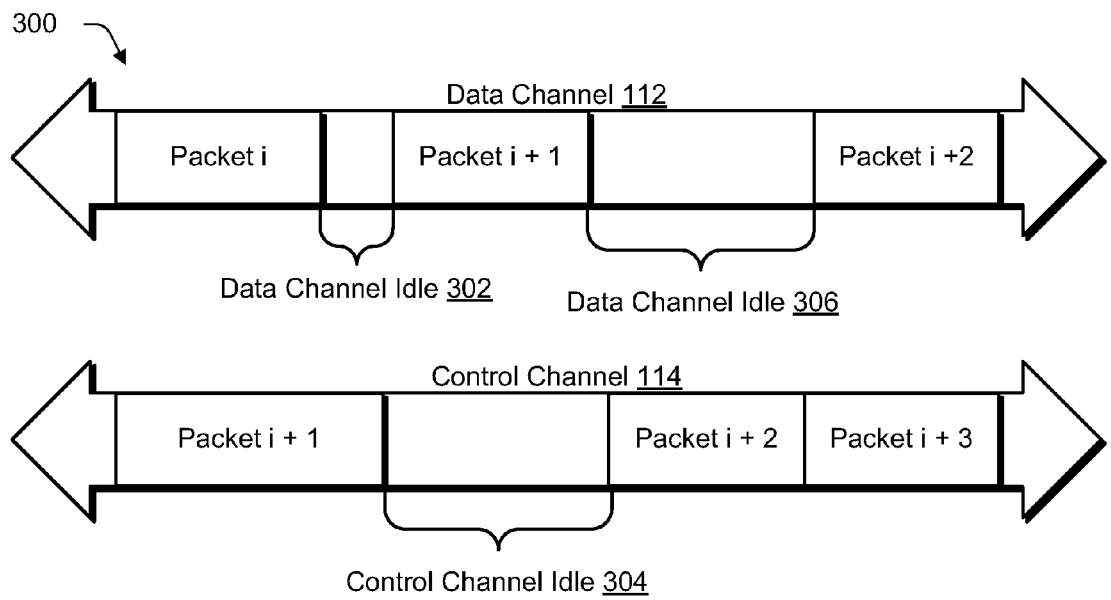
FIG. 3 is an illustration of data transfer in an exemplary implementation which may be performed using the data channel and the control channel of FIG. 1 without an advance reservation technique.

FIG. 3 is an illustration of data transfer 200 in an exemplary implementation which may be performed using the data channel 112 and the control channel 114 of FIG. 1 without an advance reservation technique. If contention resolution for packet "i+1" on the control channel 114 does not complete by the end of transmission of packet "i" on the data channel, then the data channel 112 may stay idle 302 until completion of contention resolution.

Contention resolution may take varying amounts of time, as it may depend on the "backoff" values chosen, and RTS and/or CTS collisions, if any. In addition, data transmission duration depends on the size of the data packet, which may vary from packet to packet. Further, the time for contention resolution may depend in part on a data rate of the control channel 114; however, in an implementation the protocol is insensitive to variations in the durations of contention resolution and data packet transmission. Further, the control channel may also encounter an idle period 304 which may cause a subsequent idle period for the data channel idle 306. To prevent idle periods and cope with varying durations for contention resolution, an advance reservation technique may be employed to limit and even eliminate idle time of the data channel 112 as well as the control channel 114, further discussion of which may be found in relation to the following figure.

Figure 4:
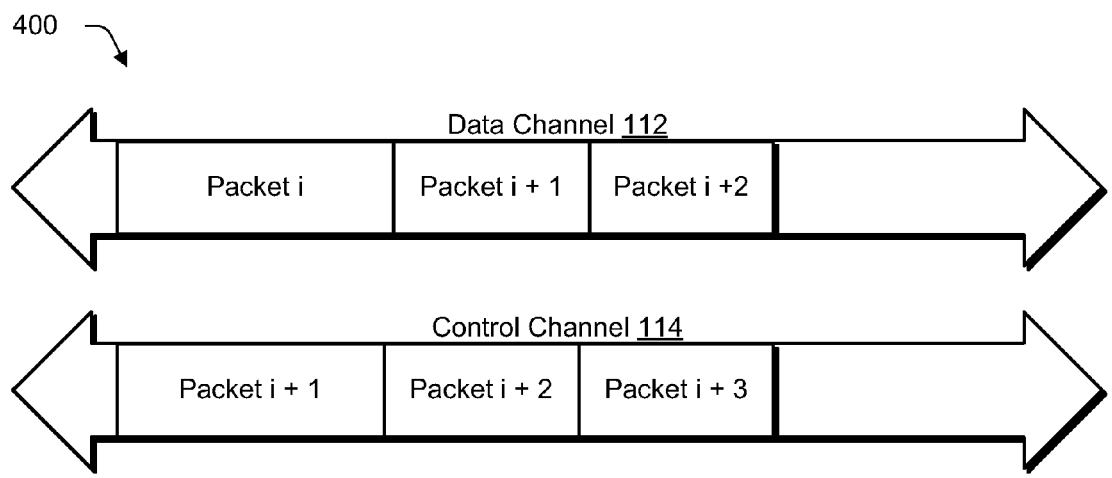
FIG. 4 is an illustration of data transfer in an exemplary implementation which may be performed using the data channel and the control channel of FIG. 1 in conjunction with an advance reservation technique.

FIG. 4 is an illustration of data transfer 400 in an exemplary implementation which may be performed using the data channel 112 and the control channel 114 of FIG. 1 in conjunction with an advance reservation technique. Advance reservation is a technique which allows each node (e.g., clients 102(1), 102(2)) to "reserve ahead" for "k" packets, where "k" is a protocol parameter. Therefore, a node transmitting packet "i" on the data channel can reserve the data channel for up to "k" additional packets using modified RTS-CTS packets exchanged on the control panel. Thus, advance reservation may be utilized to decouple contention resolution and data transfer in time through use of the separate channels. For instance, when advance reservation is not used, if the contention resolution for packet "i+2" takes longer than average, then the data channel 112 will be idle until contention resolution for packet "i+2" is completed. On the other hand, when the data transfer for packet "i" takes longer than contention resolution for packet "i+1", the idle time on the control channel cannot be utilized unless advance reservation is used as shown in the data transfer 400 of FIG. 4. The advance reservation technique may utilize a carefully chosen value for "k" that ensures that the control channel is not a bottleneck to performance as along as the average duration for contention resolution is smaller than the average duration for data transfer.

Extensions for Directional Antennas

Directional communication may be utilized for improving capacity of a wireless network. Accordingly, the protocol may be utilizing with omnidirectional as well as with direction antennas to take advantage of directional communication. For example, an omnidirectional RTS-CTS technique may be utilized in which RTS and CTS packets are sent omnidirectionally, and data and acknowledge packets are exchanged directionally. In another example, directional RTS-CTS technique may be utilized in which RTS and CTS packets are sent directionally. The direction to be used for communication may be discovered a priori. When directional RTS and CTS are used, spatial reuse increases. However, directional RTS-CTS may result in poor performance in certain topologies due to a problem know as "deafness", an example of which is described as follows.

Assume nodes A and B are communicating after a prior directional RTS-CTS exchange. Node C wishes to communicate with B and initiates a directional RTS. But B is beam-formed toward A and fails to receive the RTS. Node C may misinterpret the absence of CTS as a sign of RTS collision due to congestion, and increase its backoff, and thus degrade throughput. Thus, deafness may arise because the use of directional RTS-CTS results in some nodes in the neighborhood being unaware of ongoing communication.

In an implementation, omnidirectional transmission is utilized on the control channel 114, while using directional transmission on the data channel 112. Thus, spatial reuse benefits of directional antennas may be realized without suffering from the deafness problem previously described. When node C initiates a RTS transmission to node B on the control channel, node B may respond with a CTS since the data communication with A is proceeding on the data channel. As a result, the control channel architecture provides a solution for exploiting spatial reuse benefits of direction antennas, while not incurring the performance penalty of deafness. These benefits may be in addition to the benefits of using the control channel approach described earlier. The use of an omnidirectional control channel also simplifies the problem of neighbor discovery.

In an implementation, the range of omnidirectional RTS-CTS of the control channel 114 is at least as large as a range of directional transmission on the data channel 112. It should be noted that when the control channel 114 operates at a lower frequency than the data channel 122 as previously described, the control channel 114 may support a correspondingly greater range. Additionally, if additional range is desired, the transmission power on the control channel may be suitably increased, further discussion of which may be found in relation to the following section.

Control Channel Range

Besides having different data rates, the data and control channels 112, 114 are also likely to have different ranges. While the exact difference in the range depends on several factors such as power levels and environmental factors, it is likely that the range of the control channel will be greater than the range of the data channel.

The control channel is expected to be located in a lower frequency band, and consequently, for fixed transmission power, the control channel experiences a smaller path loss, resulting in reducing the effect of hidden terminals. For instance, the range up to which transmission may interfere with another transmission (i.e., the "interference range"), is longer than the transmission range. By using a control channel range that is close to the interference range of the data channel, each node in the interference region may be notified of an impending transmission, thereby preventing data packet collisions and also permitting maximum spatial use. For example, when the control channel range is significantly greater than the data channel range, the control channel may reserve an unnecessarily large area, reducing spatial reuse.

For instance, with the separate channel approach, RTS-CTS transmission is performed on a different channel for the DATA-ACK transmission. Hence, using longer range RTS-CTS transmission will not interfere with data transmission on the data channel. A control channel with longer range is also beneficial when using directional antennas as previously described.

Exemplary Procedures

The following discussion describes wireless communication techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 5:
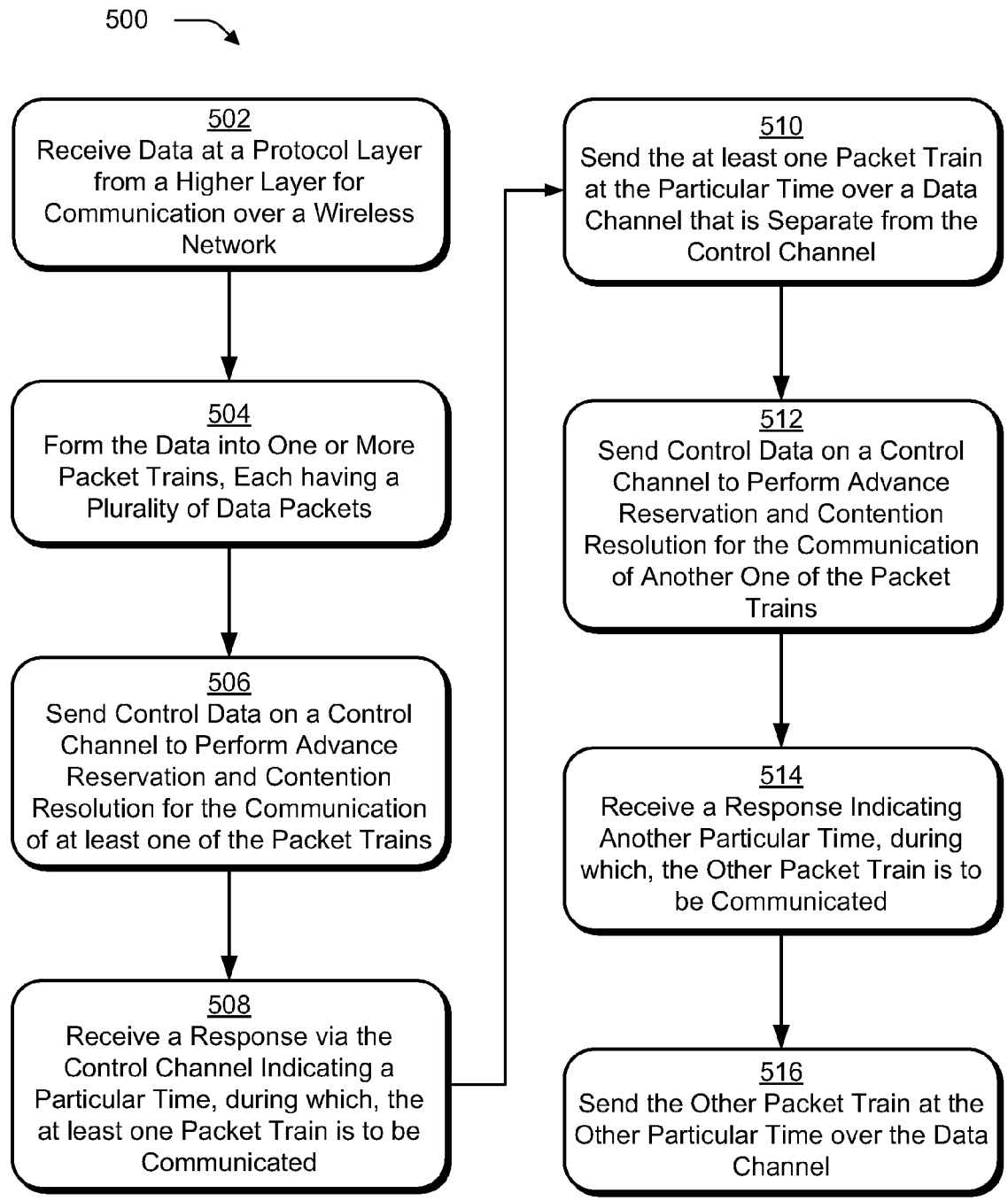
FIG. 5 is a flow diagram depicting a procedure in an exemplary implementation in which data and control information are simultaneously communicated on respective data and control channels.

FIG. 5 is a flow diagram depicting a procedure 500 in an exemplary implementation in which data and control information are simultaneously communicated on respective data and control channels. Data is received at a protocol layer from a higher layer for communication over a wireless network (block 502). For example, the wireless architecture 104 may be implemented at the protocol level and the application modules 120(1), 120(2) are not aware of the particulars as to how the data is communicated.

The data received from the higher layer is formed into one or more packet trains, each having a plurality of packets (block 504). For example, the data aggregation protocol may be utilized to form a plurality of packets, and then form those packets into the one or more packet trains as previously described.

Control data is sent on a control channel to perform advance reservation and contention resolution for the communication of at least one of the packet trains (block 506). For example, a sender may send a RTS packet over the control channel which is utilized by a receiver to confirm scheduling of a particular time, during which, the packet train is to be communicated.

A response is received via the control channel indicating a particular time, during which, the at lease one packet train is to be communicated (block 508). Continuing with the previous example, the sender may receive a CTS packet over the control channel which confirms the particular time, proposes a different time, and so on.

In this example, the at least one packet train is sent over a data channel at the particular time, the data channel being separate from the control channel (block 510). For instance, the packet train may be sent on the data channel 112 configured to have a frequency about 900 MHz, while the control channel 114 has a frequency below 900 MHz. Thus, the data channel 112 may have a higher data throughput rate than that of the control channel 114.

While the at least one packet train is sent over the data channel, control data is sent on the control channel to perform advance reservation and contention resolution for the communication of another one of the packet trains (block 512). For instance, the other one of the packet trains may be formed from the data received from the "higher" layers by the protocol layer (block 502). The reception of the data which forms the other packet train may be performed before and/or during the sending, receiving, and sending previously described (i.e., blocks 506-510).

A response is received indicating another particular time, during which, the other packet train is to be communicated (block 514). The other packet train is then sent at the other particular time over the data channel (clock 516). This procedure 500 may be repeated as additional data is received from the higher layer for transfer over the wireless network.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the described communication techniques are platform-independent, meaning that the techniques may be implemented on a variety of commercial computing platforms having a variety of processors.

Conclusion

In an implementation, the protocol splits and IEEE 802.11 protocol be operating a control portion over a low-frequency, low-data rate channel and a data portion over a high-frequency, high-data rate channel. Contention resolution occurs on the lower-rate channel (i.e., the "data channel") is used for exchanging data packets. The protocol may also be utilized to perform advance packet reservation and data aggregation to ensure that the control channel does not become a bottleneck to the data channel. Further, the protocol may perform channel arbitration and data transmission simultaneously.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
a first radio transceiver sending data packets on a first wireless channel having a first frequency band;
a second radio transceiver sending control data relating to the data packets on a second wireless channel having a second frequency band, different from the first frequency band, the second radio transceiver using at least a sliver of radio spectrum unsuitable for data transfer in the second wireless channel for the sending of the control data;
configuring the data packet for communication over the first wireless channel based at least in part on a single reservation communicated on the second wireless channel; and
determining a specified number of the data packets for an advanced reservation of the data packets for an advanced reservation, the specified number determined to limit or eliminate idle time on at least one of the first wireless channel or the second wireless channel.

2. A method as described in claim 1, wherein the second frequency band is lower than the first frequency band.

3. A method as described in claim 1, wherein the second frequency band is noncontiguous with the first frequency band.

4. A method as described in claim 1, wherein the control data is configured to provide contention resolution.

5. A method as described in claim 1, further comprising receiving data from an application.

6. A method as described in claim 5, wherein configuring the data packets for communication comprises:
forming data packets from the data that is received from the application into a packet train; and
configuring the packet train for communication over the first wireless channel.

7. A method as described in claim 6, further comprising receiving a single acknowledgement indicating which of the data packets, if any, that were included in the packet train were not received.

8. A method as described in claim 1, wherein the first radio transceiver and the second radio transceiver are embodied as a single radio transceiver.

9. A method as described in claim 1, wherein the sending of the control data is performed using an omnidirectional antenna and the sending of the data packets is performed using a directional antenna.

10. A method as described in claim 1, wherein the sending of the control data is performed at a frequency below 900 MHz and the sending of the data packets is performed at a frequency above 900 MHz.

11. A method as described in claim 1, further comprising sending control data relating to one or more other data packets simultaneously during the sending of the data packets, the one or more other data packets for sending after the sending of the data packets concludes.

12. A method comprising:
sending a first set of data packets via a radio transceiver on one or more wireless channels; and
sending control data via said radio transceiver or a second radio transceiver on at least one other wireless channel using a band having a second frequency, the sending of the control data occurring during or before the sending of the first set of data packets, wherein:
the second frequency is lower than the first frequency;

the second frequency is non-contiguous with the first frequency; and the control data is configured to reserve a time on the one or more wireless channels to send a second set of data packets subsequent to the sending of the first set of data packets.

13. A method as described in claim 12, further comprising:

forming the second set of data packets into a packet train that is configured for communication over the one or more wireless channels during the reserved time; and receiving a single acknowledgement indicating which of the second set of data packets, if any, that were included in the packet train were not received.

14. A method as described in claim 12, further comprising sending the second set of data packets during the reserved time.

15. A method as described in claim 12, wherein the second set of data packets are configured to be sent on the one or more wireless channels subsequent to the sending of the first set of data packets.

16. A method as described in claim 12, wherein the sending of the control data is performed at a frequency below 900 MHz and the sending of the data packets is performed at a frequency above 900 MHz.

17. A method as described in claim 12, wherein the sending of the control data is performed using an omnidirectional antenna and the sending of the data packets is performed using a directional antenna.

18. A system comprising:

a data aggregation protocol configured to:
 form, from data that is received from an application, a first set of data packets and a second set of data packets; and
 form the second set of data packets into a packet train; and a radio transceiver configured to:
 send the first set of data packets via a first wireless channel having a first frequency band above 900 MHz;
 send contention control data relating to the second set of data packets via a second wireless channel having a frequency below 900 MHz simultaneously during the sending of the first set of data packets;
 send the packet train over the first wireless channel during a period of time specified by a single reservation communicated by the second wireless channel via the second frequency band; and
 receive a single acknowledgement indicating which of the data packets, if any, that were included in the packet train were not received.

19. A system as described in claim 18, wherein:

the radio transceiver is configured to send the contention control data using an omnidirectional antenna; and the radio transceiver is configured to send the first and second sets of data packets using a directional antenna.

* * * * *